(12) United States Patent
Yoshimasa et al.

(10) Patent No.: US 9,889,674 B2
(45) Date of Patent: Feb. 13, 2018

(54) INK, INK CARTRIDGE, AND IMAGE RECORDING METHOD

(71) Applicant: CANON KABUSHIKI KAISHA, Tokyo (JP)

(72) Inventors: Yutaka Yoshimasa, Yokohama (JP); Masahiro Terada, Hadano (JP); Hidetaka Kawamura, Yokohama (JP); Akihiro Taya, Yokohama (JP); Yohei Masada, Tokyo (JP); Masanobu Ootsuka, Tokyo (JP); Takaharu Aotani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/220,319

(22) Filed: Jul. 26, 2016

(65) Prior Publication Data

US 2017/0029641 A1    Feb. 2, 2017

(30) Foreign Application Priority Data

Jul. 29, 2015  (JP) .................................. 2015-149975

(51) Int. Cl.
*B41J 2/21* (2006.01)
*C09D 11/102* (2014.01)
(Continued)

(52) U.S. Cl.
CPC .............. *B41J 2/2107* (2013.01); *B41J 2/175* (2013.01); *C09D 5/08* (2013.01); *C09D 11/037* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
(Continued)

(56) References Cited

U.S. PATENT DOCUMENTS 5,693,129 A * 12/1997 Lin .................... C09D 11/38
347/100
2004/0254264 A1* 12/2004 Suzuki ................ C09D 11/40
523/160
(Continued)

FOREIGN PATENT DOCUMENTS

EP    2662422 A1    11/2013
EP    3088477 A1    11/2016
(Continued)

*Primary Examiner* — Manish S Shah
(74) *Attorney, Agent, or Firm* — Canon U.S.A., Inc. IP Division

(57) ABSTRACT

An ink of this invention contains a self-dispersible pigment having a phosphonic acid group bonded directly or through another atomic group to the surface of the self-dispersible pigment, polyurethane resin particles, a monovalent inorganic salt, and water.

14 Claims, 1 Drawing Sheet

(51) Int. Cl.
  *C09D 11/322* (2014.01)
  *C09D 11/38* (2014.01)
  *B41J 2/175* (2006.01)
  *C09D 5/08* (2006.01)
  *C09D 11/037* (2014.01)
  *C09D 11/52* (2014.01)

(52) U.S. Cl.
  CPC .......... *C09D 11/102* (2013.01); *C09D 11/322* (2013.01); *C09D 11/38* (2013.01); *C09D 11/52* (2013.01)

(58) Field of Classification Search
  USPC .................................................... 347/95–105
  See application file for complete search history.

(56) References Cited

U.S. PATENT DOCUMENTS

2006/0268086 A1* 11/2006 Kawakami ............. C09D 11/40
                                                                      347/100
2013/0027463 A1    1/2013 Ogasawara
2014/0204156 A1*  7/2014 Gotou ........................ B41J 2/01
                                                                      347/100

FOREIGN PATENT DOCUMENTS

| JP | 2005-515289 A |   | 5/2005  |              |
|----|---------------|---|---------|--------------|
| JP | 2012-233163 A |   | 11/2012 |              |
| JP | 2013253236 A  | * | 12/2013 | ........... C09D 11/322 |
| WO | 2012132305 A1 |   | 10/2012 |              |

* cited by examiner

… (US 9,889,674 B2)

INK, INK CARTRIDGE, AND IMAGE RECORDING METHOD

BACKGROUND OF THE INVENTION

Field of the Invention

The present invention relates to an ink and an ink cartridge and an image recording method employing the ink.

Description of the Related Art

Heretofore, in an image recording method, an ink containing a self-dispersible pigment as a coloring material has been used for the purpose of increasing the optical density of images. In particular, it is known that a self-dispersible pigment having a phosphonic acid group bonded directly or through another atomic group to the surface (hereinafter also simply referred to as a "phosphonic acid-based self-dispersible pigment") easily provides images particularly high color development properties (Japanese Patent Laid-Open No. 2012-233163). Japanese Patent Laid-Open No. 2012-233163 describes combining a self-dispersible pigment having a phosphonic acid group, a resin having a specific acid value, and a specific surfactant to thereby obtain an image having high color development properties.

However, the ink containing a self-dispersible pigment has high color development properties of images but has had a problem that the scratch resistance of images is low. Then, an examination for improving the scratch resistance of images by further blending polyurethane resin particles in the ink containing a self-dispersible pigment has been made (PCT Japanese Translation Patent Publication No. 2005-515289). PCT Japanese Translation Patent Publication No. 2005-515289 describes that the scratch resistance of images is improved by an aqueous ink jet ink containing a self-dispersible pigment and a polyurethane resin having an acid group.

SUMMARY OF THE INVENTION

One aspect of the present invention provides an ink containing a self-dispersible pigment having a phosphonic acid group bonded directly or through another atomic group to the surface of the self-dispersible pigment, polyurethane resin particles, a monovalent inorganic salt, and water.

Another aspect of the present invention provides an ink cartridge having an ink containing portion containing the above-described ink.

Another aspect of the present invention provides an image recording method including an ink application process of applying the above-described ink to a record medium.

The present invention can provide an ink which can achieve both color development properties and scratch resistance of images at a high level and which is excellent in storage stability. Moreover, the present invention can provide an ink cartridge and an image recording method employing the above-described ink.

Further features of the present invention will become apparent from the following description of exemplary embodiments with reference to the attached drawings.

DESCRIPTION OF THE EMBODIMENTS

Figure 1:
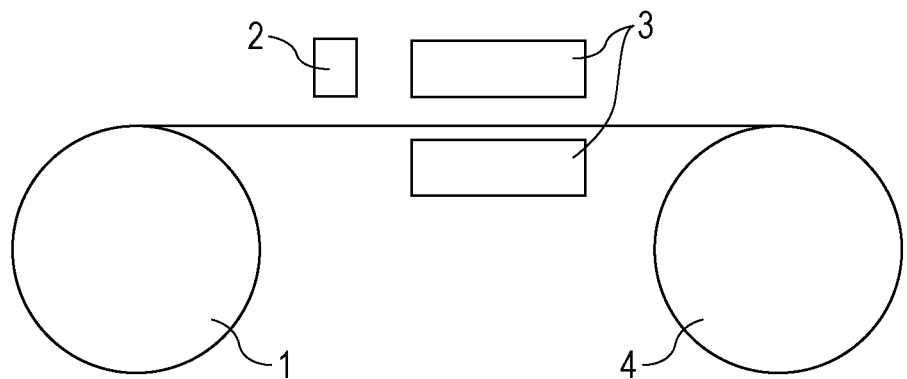
FIG. 1 is a schematic view illustrating an example of an image recording apparatus for use in an image recording method of the present invention.

According to an examination of the present inventors, in the ink containing the phosphonic acid-based self-dispersible pigment and polyurethane resin particles, a phenomenon occurs in which the viscosity has gradually decreased during long-term storage, so that the storage stability has not been sufficient.

Therefore, the present invention provides an ink which can achieve both color development properties and scratch resistance of images at a high level and which is excellent in storage stability. The present invention also provides an ink cartridge and an image recording method employing the ink of the present invention.

Hereinafter, the present invention is described in detail with reference to suitable embodiments.

As a result of performing various examinations about the phenomenon in which the viscosity gradually decreases during long-term storage described above, the present inventors have found that impurities (ionic substances and the like) eluting from the self-dispersible pigment has caused the phenomenon.

Then, the present inventors have examined the ink configuration in which, even when impurities are eluted, the viscosity does not greatly change, and, as a result, the present inventors have reached the configuration of the present invention. More specifically, the present inventors have found that, by blending a monovalent inorganic salt together with the phosphonic acid-based self-dispersible pigment and polyurethane resin particles in an ink, an ink can be provided in which viscosity changes during long-term storage can be suppressed and which is excellent in storage stability in addition to color development properties and scratch resistance of images. The mechanism of obtaining the effects of the present invention by the configuration is considered as follows.

When impurities are eluted from the phosphonic acid-based self-dispersible pigment during long-term storage, spatial spread of counter ions of polyurethane resin particles is suppressed. As a result, the counter ions concentrate around the resin, and thus distortion is hard to occur, so that the viscosity decreases. The size of the spatial spread of the counter ions may be affected by the amount and the type of electric charges. As a result of an examination on various kinds of salts of the present inventors, the present inventors have found that the use of the monovalent inorganic salt can suppress the concentration of the counter ions around the resin, and thus the viscosity change can be suppressed. On the other hand, organic salts or divalent or more polyvalent salts are likely to interact with pigments, and thus thickening and aggregation are likely to occur during storage.

Ink

The ink of the present invention is suitably an ink for use in ink jet image recording methods, i.e., an ink jet ink. Hereinafter, the components configuring the ink of the present invention are individually described.

Self-dispersible pigment having phosphonic acid group bonded directly or through another atomic group to the surface.

The ink of the present invention contains a self-dispersible pigment having a phosphonic acid group bonded directly or through another atomic group to the surface. The form of the phosphonic acid group in the ink may be any form in a state where the phosphonic acid group is partially dissociated or entirely dissociated.

The content (% by mass) of the self-dispersible pigment having a phosphonic acid group bonded directly or through another atomic group to the surface in the ink is preferably 0.1% by mass or more and 15.0% by mass or less, more preferably 0.1% by mass or more and 8.0% by mass or less, and particularly preferably 3.0% by mass or more and 6.0% by mass or less based on the total mass of the ink. When the content is less than 1.0% by mass, color development properties are not sufficiently obtained in some cases. When the content is higher than 10.0% by mass, ink ejection stability is not sufficiently obtained in some cases.

The average particle diameter of the self-dispersible pigment in the present invention is suitably 50 nm or more and 200 nm or less.

Phosphonic Acid Group

In the present invention, the phosphonic acid group is bonded directly or through another atomic group (—R—) to the surface of pigment particles. Examples of the phosphonic acid group include a $PO_3HM$ group, a $PO_3M_2$ group, and the like. In the formulae above, M represents a hydrogen atom, alkaline metal, ammonium, or organic ammonium. In particular, it is more suitable for the phosphonic acid group to have the structure of —$CQ(PO_3M_2)_2$. Q in the formula above represents a hydrogen atom, R', OR', SR', or NR'$_2$. R's each independently represent a hydrogen atom, an alkyl group, an acyl group, an aralkyl group, or an aryl group. Specifically, examples of the alkyl group include a methyl group and an ethyl group; examples of the acyl group include an acetyl group and a benzoyl group; examples of the aralkyl group include a benzyl group; and examples of the aryl group include a phenyl group and a naphthyl group. In the present invention, —$CH(PO_3M_2)_2$ in which R' represents a hydrogen atom is particularly suitable among the above. As other atomic groups (—R—), an amide group, an amino group, a ketone group, an ester group, an ether group, an alkylene group having 1 to 12 carbon atoms, a substituted or unsubstituted phenylene group, or a substituted or unsubstituted naphtylene group is mentioned. In the present invention, it is suitable that —R— contains —$C_6H_4$—CONH— (benzamide structure) or —$C_6H_4$—$SO_2$NH— (benzenesulfonamide structure) among the above. In the present invention, a plurality of phosphonic acid groups may be bonded to carbon atoms of the other atomic groups (—R—). Specifically, self-dispersible pigments having atomic groups, to which a bisphosphonic acid group and a triphosphonic group are bonded, bonded to the surface are mentioned. Among the above, the self-dispersible pigment having the atomic group, to which the bisphosphonic acid group is bonded, bonded thereto is suitable from the viewpoint of achieving both fastness of an image and dispersion stability of the pigment during long-term storage.

Pigment Type

Examples of pigments usable in the ink of the present invention include inorganic pigments, such as carbon black, and organic pigments. All known pigments can be used as pigments usable in the ink.

As the carbon black usable in the ink for use in the present invention, any carbon black generally used in inks heretofore can be used. Specifically, furnace black, acetylene black, channel black, thermal black, and lamp black are mentioned. Furthermore, specifically, commercially-available carbon black mentioned below can be used. For example, mentioned are Raven: 7000, 5750, 5250, 5000ULTRA, 3500, 2000, 1500, 1255, 1250, 1200, 1190 ULTRA-II, and 1170 (manufactured by Columbian Chemicals Company, Inc.); Monarch: 700, 800, 880, 900, 1000, 1100, 1300, 1400, and 2000 (all manufactured by Cabot Corporation); Black Pearls: 880, 800, and L (manufactured by Cabot Corporation); Color Black FW1, FW2, FW2V, FW18, FW200, S150, S160, and S170 (all manufactured by Degussa); Printex: 85, 95, 140U, 140V, U, and V (all manufactured by Degussa); Special Black: 6, 5, A4, and 4 (all manufactured by Degussa); No. 900, No. 1000, No. 2200B, No. 2300, No. 2350, No. 2400R, and MCF-88 (all manufactured by Mitsubishi Chemical Corporation). It is a matter of course that carbon black newly prepared for the present invention can also be used. As the phosphonic acid-based self-dispersible carbon black, CAB-O-JET400 (manufactured by Cabot Corporation) is mentioned, for example.

The organic pigments usable in the ink for use in the present invention are as follows. As cyan pigments, a copper phthalocyanine pigment is suitably used. Specifically, C.I. Pigment Blue 1, 2, 3, 15, 15:2, 15:3, 15:4, 16, 22, and 60 are mentioned. As phosphonic acid-based self-dispersible cyan pigments, CAB-O-JET 450C (manufactured by Cabot Corporation) is mentioned, for example. As magenta pigments, a quinacridone pigment is suitably used. Specifically, C.I. Pigment Red 5, 7, 12, 48, 48:1, 57, 112, 122, 123, 146, 168, 184, 202, and 207; and C.I. Pigment Violet 19 are mentioned. As phosphonic acid-based self-dispersible magenta pigments, CAB-O-JET 465M and CAB-O-JET 480V (all manufactured by Cabot Corporation) are mentioned, for example. As yellow pigments, an azo pigment is suitably used. Specifically, C.I. Pigment Yellow 12, 13, 14, 16, 17, 74, 83, 93, 95, 97, 98, 114, 128, 129, 151, and 154 are mentioned. As phosphonic acid-based self-dispersible yellow pigments, CAB-O-JET 470Y (manufactured by Cabot Corporation) is mentioned, for example.

Method for Analyzing Pigment

In the present invention, a method for verifying whether or not the pigment contained in the ink is the self-dispersible pigment is as follows. Specifically, the ink is subjected to acid-precipitation, and then centrifuged to collect a precipitate. In the case of a pigment dispersion, the pigment dispersion is subjected to acid-precipitation, and then a precipitate is collected. The collected precipitate is taken to a petri dish, water is poured thereinto, and then the mixture is stirred for re-dispersion. After letting stand for one day, when no precipitate is generated in the petri dish and the pigment is dispersed, it is judged that the pigment is the self-dispersion type pigment.

When the pigment contained in the ink is the self-dispersible pigment, it can be verified with an ICP optical emission spectrometer whether or not the pigment has a phosphonic acid group. Specifically, when a phosphorus element is confirmed using the ICP optical emission spectrometer, it is judged that the pigment has a phosphonic acid group.

Monovalent Inorganic Salt

The ink of the present invention contains a monovalent inorganic salt. The monovalent inorganic salt as used in the present invention refers to inorganic salt containing a monovalent cation and a monovalent anion. The form of the salt in the ink may be any form in the state where the salt is partially dissociated or entirely dissociated.

The content (% by mass) of the monovalent inorganic salt in the ink is preferably 0.005% by mass or more and 10.0% by mass or less, more preferably 0.01% by mass or more and 5% by mass or less, and particularly preferably 0.1% by mass or more and 1.0% by mass or less based on the total mass of the ink. When the content is less than 0.005% by mass, an improvement effect of storage stability is not sufficiently obtained in some cases. When the content is higher than 10.0% by mass, ink ejection stability is not sufficiently obtained in some cases.

The content (% by mass) of the monovalent inorganic salt in the ink is preferably 0.005 times or more and 1.00 times or less the content of the polyurethane resin particles. The mass ratio is preferably 0.01 times or more and 0.25 times or less and particularly preferably 0.05 times or more and 0.1 times or less. When the mass ratio is less than 0.005 times, an improvement effect of storage stability is not sufficiently obtained in some cases. When the content is higher than 10.0% by mass, ink ejection stability is not sufficiently obtained in some cases.

The monovalent cation is suitably at least one kind selected from the group consisting of alkali metal ions and ammonium ions, more suitably an alkali metal ion, and particularly suitably a potassium ion. More specifically, the inorganic salt is particularly suitably a potassium salt. The monovalent anion is suitably at least one kind selected from the group consisting of $Cl^-$, $Br^-$, $I^-$, $ClO^-$, $ClO_2^-$, $ClO_3^-$, $ClO_4^-$, $NO_2^-$, $NO_3^-$, $H_2PO_4^-$, $HCO_3^-$, $HCOO^-$, and $COOH$ ($COO^-$).

Polyurethane Resin Particles

In the present invention, the volume-average particle diameter of the polyurethane resin particles is suitably 10.0 nm or more and 50.0 nm or less. The volume-average particle diameter of the polyurethane resin particles is more suitably 15.0 nm or more and 30.0 nm or less. The volume-average particle diameter of the resin particles in the present invention can be determined by the following method. Specifically, a resin particle dispersion may be diluted with pure water to 100 to 1,000 times (on a volume basis), and then may be measured using UPA-EX150 (manufactured by Nikkiso) under the measurement conditions of Set Zero: 30 s, Measurement number of times: 3 times; Measurement time: 180 seconds, and Refractive index: 1.5.

In the present invention, the amount of anionic functional groups of the surface of the polyurethane resin particles is suitably 0.1 mmol/g or more and 0.4 mmol/g or less. The amount of anionic functional groups of the surface of the polyurethane resin particles can be determined by subjecting a water dispersion of the polyurethane resin particles to colloid titration. In Examples described later, the amount of anionic functional groups of the surface of the polyurethane resin particles in the polyurethane resin particle dispersion was measured by colloid titration utilizing a potential difference using a potential difference automatic titrator (AT-510; manufactured by KYOTO ELECTRONICS MANUFACTURING CO., LTD.) having a flow potential titration unit (PCD-500). In this measurement, methyl glycol chitosan was used as a titration reagent. To measure the amount of anionic functional groups of the surface of the polyurethane resin particles contained in the ink, it is necessary to first separate the pigment and the polyurethane resin particles from each other. The ink is centrifuged under the conditions of 23° C., 440,000 G, and 2 hours to collect a supernatant containing the polyurethane resin particles, and then the amount of anionic functional groups of the surface can be measured by the measuring method described above. In the present invention, examples of the anionic functional group contained in the polyurethane resin particles include —COOM, —$SO_3$M, —$PO_3$HM, —$PO_3M_2$, and the like. In the formulae, "M" represents a hydrogen atom, alkaline metal, ammonium, or organic ammonium. Among the above, as the anionic functional group is suitably —COOM from the viewpoint of dispersion stability and "M" is suitably triethylamine which is organic ammonium.

The acid value of the polyurethane resin particles is preferably 100 mgKOH/g or less and more preferably 30 mgKOH/g or more and 60 mgKOH/g or less. The acid value of the polyurethane resin particles can be measured by a titrating method. For example, the acid value may be measured by dissolving the resin particles in THF, and then performing potentiometric titration with potassium hydroxide ethanol titration liquid using a potential difference automatic titrator AT510 (manufactured by KYOTO ELECTRONICS MANUFACTURING CO., LTD.).

The weight-average molecular weight (Mw) in terms of polystyrene obtained by GPC (gel permeation chromatography) of the polyurethane resin particles for use in the ink of the present invention is preferably 5,000 or more and 150,000 or less and more preferably 8,000 or more and 100,000 or less. The measurement of the weight-average molecular weight of the resin particles may be performed using a device: Alliance GPC2695 (manufactured by Waters), Column: Series of four Shodex KF-806M (manufactured by Showa Denko) columns, and Detector: RI (refractive index), and then the weight-average molecular weight of the resin particles may be calculated using PS-1 and PS-2 (manufactured by Polymer Laboratories) as polystyrene standard samples.

In the present invention, the content of the polyurethane resin particles is preferably 3.0% by mass or more and 15.0% by mass or less and more preferably 5.0% by mass or more and 8.0% by mass or less based on the total mass of the ink. When the content is less than 3.0% by mass, an improvement effect of scratch resistance of images to be obtained is not sufficiently obtained in some cases. When the content is higher than 15.0% by mass, ink ejection stability is not sufficiently obtained in some cases.

Method for Manufacturing Polyurethane Resin Particles

As a method for manufacturing the polyurethane resin particles in the present invention, any method generally used heretofore can be used. For example, the following methods are mentioned. A polyol having no acid group is sufficiently stirred and dissolved in an organic solvent, such as methyl ethyl ketone, and then polyisocyanate and a diol having an acid group are added to cause a reaction to thereby obtain a urethane prepolymer solution. Subsequently, the obtained urethane prepolymer solution is neutralized, ion exchange water is added, and then the mixture is stirred at a high speed with a homomixer for emulsification. After the emulsification, a chain extender is added to cause a chain extension reaction.

Materials configuring the polyurethane resin particles are described below.

(1) Polyisocyanate

In the present invention, it is suitable for the polyurethane resin particles to have a unit derived from polyisocyanate. The "polyisocyanate" as used in the present invention refers to a compound having two or more isocyanate groups. Specific examples of polyisocyanates usable in the present invention include aliphatic polyisocyanate, alicyclic polyisocyanate, aromatic polyisocyanate, and araliphatic polyisocyanate. The proportion of the unit derived from polyisocyanate occupying the polyurethane resin particles is suitably 10.0% by mass or more and 80.0% by mass or less.

Examples of the aliphatic polyisocyanate include tetramethylene diisocyanate, dodecamethylene diisocyanate, hexamethylene diisocyanate, 2,2,4-trimethyl hexamethylene diisocyanate, 2,4,4-trimethyl hexamethylene diisocyanate, lysine diisocyanate, 2-methylpentane-1,5-diisocyanate, and 3-methylpentane-1,5-diisocyanate. Examples of the alicyclic polyisocyanate include isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatemethyl)cyclohexane. Examples of the aromatic polyisocyanate include tolylene diisocyanate, 2,2'-diphenyl methane diisocyanate, 2,4'-diphenyl methane diisocyanate, 4,4'-diphenyl methane diisocyanate, 4,4'-dibenzyl diisocyanate, 1,5-naphtylene diisocyanate, xylylene diisocyanate, 1,3-phenylene diisocyanate, and 1,4-phenylene diisocyanate. Examples of the araliphatic polyisocyanate include dialkyldiphenylmethane diisocyanate, tetraalkyldiphenylmethane diisocyanate, and α,α,α,α-tetramethylxylylene diisocyanate. These polyisocyanates can be used alone or in combination of two or more kinds thereof as necessary. In the present invention, among the polyisocyanates, at least one kind selected from isophorone diisocyanate, hexamethylene diisocyanate, and dicyclohexylmethane 4,4'-diisocyanate is suitably used. In particular, isophorone diisocyanate is more suitably used.

(2) Polyol Having No Acid Group

In the present invention, it is suitable for the polyurethane resin particles to have a unit derived from polyol having no acid group. The proportion of the unit derived from a polyol having no acid group occupying the polyurethane resin particles is suitably 0.1% by mass or more and 80.0% by mass or less.

Examples of the polyol having no acid group include polyester polyol, polyether polyol, polycarbonate diol, and the like. The polyol having no acid group for use in the present invention suitably has a number of carbon atoms of 13 or more and 250 or less. The number-average molecular weight in terms of polystyrene obtained by GPC of the polyol having no acid group is suitably 600 or more and 4,000 or less.

Examples of the polyester polyol include esters of acid components with polyalkylene glycols, divalent alcohols, or tervalent or more polyhydric alcohols, for example. Examples of the acid components configuring the polyester polyol include aromatic dicarboxylic acids, alicyclic dicarboxylic acids, aliphatic dicarboxylic acids, and the like. Examples of the aromatic dicarboxylic acids include isophthalic acid, terephthalic acid, orthophthalic acid, 1,4-naphthalene dicarboxylic acid, 2,5-naphthalene dicarboxylic acid, 2,6-naphthalene dicarboxylic acid, biphenyl dicarboxylic acid, tetrahydrophthalic acid, and the like. Examples of the alicyclic dicarboxylic acids include hydrogenated substances of the aromatic dicarboxylic acids and the like. Examples of the aliphatic dicarboxylic acids include malonic acid, succinic acid, tartaric acid, oxalic acid, glutaric acid, adipic acid, pimelic acid, suberic acid, azelaic acid, sebacic acid, alkyl succinic acid, linoleic acid, maleic acid, fumaric acid, mesaconic acid, citraconic acid, itaconic acid, and the like. Moreover, reactive derivatives, such as acid anhydrides, alkyl esters, or acid halides of these acid components and the like can also be used as the acid components configuring the polyester polyol. The acid components configuring the polyester polyol can be used alone or in combination of two or more kinds thereof as necessary. Examples of the polyalkylene glycols include polyethylene glycol, polypropylene glycol, polytetramethylene glycol, an ethylene glycol-propylene glycol copolymer, and the like. Examples of the divalent alcohols include hexamethylene glycol, tetramethylene glycol, ethylene glycol, diethylene glycol, propylene glycol, dipropylene glycol, 1,3-butane diol, 1,4-butane diol, 4,4'-dihydroxyphenylpropane, 4,4'-dihydroxyphenylmethane and the like. Examples of the tervalent or more polyhydric alcohols include glycerol, trimethylol propane, 1,2,5-hexanetriol, 1,2,6-hexanetriol, pentaerythritol, and the like. Theses polyester polyols can be used alone or in combination of two or more kinds thereof as necessary.

Examples of the polyether polyol include polyalkylene glycols and addition polymers of alkylene oxides and divalent alcohols or tervalent or more polyhydric alcohols, for example. Examples of the polyalkylene glycols include polyethylene glycol, polypropylene glycol, polytetramethylene glycol, an ethylene glycol-propylene glycol copolymer, and the like. Examples of the divalent alcohols include hexamethylene glycol, tetramethylene glycol, ethylene glycol, diethylene glycol, propylene glycol, dipropylene glycol, 1,3-butane diol, 1,4-butane diol, 4,4'-dihydroxy phenyl propane, 4,4'-dihydroxy phenyl methane, and the like. Examples of the tervalent or more polyhydric alcohols include glycerol, trimethylol propane, 1,2,5-hexanetriol, 1,2,6-hexanetriol, pentaerythritol, and the like. As the alkylene oxides, ethylene oxide, propylene oxide, butylene oxide, α-olefin oxide, and the like can be mentioned. These polyether polyols can be used alone or in combination of two or more kinds thereof as necessary.

As the polycarbonate diol, polycarbonate diol produced by known methods can be used. For example, polycarbonate diols obtained by reacting carbonate components, such as alkylene carbonate, diaryl carbonate, and dialkyl carbonate, or phosgene and aliphatic diol components are mentioned. These polycarbonate diols can be used alone or in combination of two or more kinds thereof as necessary.

In the present invention, particularly polyether polyol among the polyols having no acid groups is suitably used. More specifically, the polyurethane resin particles are suitably polyether-based polyurethane resin particles having units derived from polyether polyols. Since the flexibility of a resin film is moderately demonstrated by the use of polyether polyols, the scratch resistance of images is easily improved. Furthermore, since the hydrophilicity of the polyether polyols is relatively high, the ink ejection stability is also excellent. Among polyether polyols, it is more suitable to use particularly a polytetramethylene ether glycol.

(3) Diol Having Acid Group

In the present invention it is suitable for the polyurethane resin particles to have a unit derived from a diol having an acid group. The diol having an acid group as used in the present invention refers to a diol having an acid group, such as a carboxyl group, a sulfonic acid group, and a phosphoric acid group. The diol having an acid group may be present in the form of alkali metal salt, such as Li, Na, and K, or organic amine salts, such as ammonia and dimethylamine. As the diol having an acid group, dimethylol propionic acid and dimethylol butanoic acid are suitably used. These substances can be used alone or in combination of two or more kinds thereof as necessary. The proportion of the unit derived from the diol having an acid group occupying the polyurethane resin particles is suitably 5.0% by mass or more and 40.0% by mass or less.

(4) Chain Extender

In the present invention, when producing the polyurethane resin particles, a chain extender may be used. The chain extender is a compound reacting with a residual isocyanate group which did not form a urethane bond among polyisocyanate units of urethane polymers. Examples of the chain extender include, for example, polyvalent amine compounds, such as trimethylolmelamine and a derivative thereof, dimethylol urea and a derivative thereof, dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. Moreover, mentioned are ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerol, trimethylol propane, and pentaerythritol. These chain extenders can be used alone or in combination of two or more kinds thereof as necessary.

Surfactant

It is suitable for the ink of the present invention to contain a surfactant. Any known surfactant can be used as the surfactant and, it is suitable for the ink of the present invention to contain particularly nonionic surfactants. Among the nonionic surfactants, ethylene oxide adducts, such as polyoxyethylene alkyl ether and acetylene glycol, are more suitable and those represented by the following general formula (1) are particularly suitable.

General Formula (1)

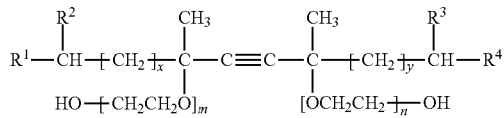

In General Formula (1), $R^1$ to $R^4$ each independently represent alkyl groups having 1 to 3 carbon atoms. In particular, $R^1$ to $R^4$ are suitably methyl groups. It is suitable that x and y each independently are 1 to 5. Both x and y are particularly suitably 1 to 2. It is suitable that m and n each independently are 0 to 7. m+n is suitably 0 to 10. In particular, m+n is suitably 2 to 8.

Examples of the surfactants represented by General Formula (1) above include Dynol 604, 607, 800, and 810 (all manufactured by Air Products Japan, Inc.) and the like, for example.

The content of the surfactant is preferably 0.5% by mass or more and 3.0% by mass or less and more preferably 0.7% by mass or more and 1.5% by mass or less based on the total mass of the ink. When the content is less than 0.5% by mass, ink ejection stability is not sufficiently obtained in some cases. When the content is higher than 3.0% by mass, an improvement effect of color development properties of images is not sufficiently obtained in some cases.

The content of the surfactant is suitably 0.05 times or more and 1.00 times or less the content of the polyurethane resin particles described above. The mass ratio is preferably 0.10 times or more and 0.50 times or less and more preferably 0.10 times or more and 0.25 times or less.

Water and Water-Soluble Organic Solvent

The ink of the present invention contains water and a water-soluble organic solvent. As the water, deionized water (ion exchange water) is suitably used. The content of the water in the ink is suitably 50% by mass or more and 90% by mass or less based on the total mass of the ink. The "water-soluble organic solvent" as used in the present invention refers to an "organic solvent having solubility at 20° C. in water of 500 g/l or more". As the water-soluble organic solvent, any known water-soluble organic solvent can be used as the water-soluble organic solvent usable in the ink. For example, alcohols, glycols, alkylene glycols, polyethylene glycols, nitrogen containing compounds, and sulfur containing compounds are mentioned. These water-soluble organic solvents can be used alone or in combination of two or more kinds thereof as necessary. In particular, polyethylene glycols and glycerol are suitably used from the viewpoint of viscosity adjustment of the ink. As the polyethylene glycols, polyethylene glycols having a number-average molecular weight of 500 or more and 1,200 or less are suitably used and polyethylene glycol having a number-average molecular weight of 1,000 (so-called "polyethylene glycol 1000") is particularly suitably used. When using the polyethylene glycols and glycerol in combination, the content of the polyethylene glycols is suitably 0.15 times or more and 0.40 times or less the content of glycerol in terms of mass ratio.

The content of the water-soluble organic solvent in the ink is preferably 50% by mass or less and more preferably 5% by mass or more and 45% by mass or less based on the total mass of the ink.

Additive

The ink of the present invention may contain various additives, such as surfactants other than the surfactants mentioned above, a pH adjuster, an antirust, an antiseptic, an antifungal agent, an antioxidant, a reduction inhibitor, an evaporation promoter, and a chelating agent, as necessary.

As the pH adjuster, amine compounds having buffer capacity are suitably used and, particularly, N-butyldiethanolamine is suitably used.

Physical Properties of Ink

In the present invention, the pH of the ink is suitably 7.0 or more and 8.7 or less. In particular, when triethylamine is used as a counter ion ("M" described above) of the anionic functional group contained in the polyurethane resin particles, it is suitable to set the pH in the range mentioned above from the viewpoint of stability of polyurethane resin particles. Specifically, when triethylamine is used as the counter ion of the anionic functional group, the triethylamine is easily separated from the anionic functional group to be volatilized due to the fact that pH of the ink becomes larger than 8.7.

In the present invention, the surface tension of the ink is preferably 40 mN/m or less and more preferably 35 mN/m or less. It is suitable to apply a so-called "permeation type ink" satisfying the range mentioned above to the present invention because an improvement effect of color development properties is remarkably obtained.

In the present invention, the electroconductivity of the ink needs to be 500 μS/cm or more and 3000 μS/cm or less. The electroconductivity of the ink is preferably 800 μS/cm or more and 2000 μS/cm or less and particularly preferably 1000 μS/cm or more and 1500 μS/cm or less.

Ink Cartridge

An ink cartridge of the present invention has an ink containing portion containing an ink, in which the ink of the present invention described above is contained in the ink containing portion. As the structure of the ink cartridge, an ink cartridge is mentioned in which the ink containing portion contains an ink containing chamber containing a liquid ink and a negative pressure generating member containing chamber containing a negative pressure generating member holding an ink therein due to negative pressure. Alternatively, an ink cartridge may be acceptable which does not have an ink containing chamber containing a liquid ink and in which the total containing amount is held by a negative pressure generating member. Furthermore, an ink cartridge may be configured so as to have an ink containing portion and a recording head.

Image Recording Method

An image recording method of the present invention has an ink application process of applying the ink described above to a record medium. Furthermore, it is suitable for the image recording method to have a conveyance process of conveying a record medium and a heating process of heating a record medium to which the ink is applied.

FIG. 1 is a schematic view illustrating an example of an image recording apparatus for use in the image recording method of the present invention. In the image recording apparatus illustrated in FIG. 1, the form is illustrated in which recording is performed using a record medium rolled in a roll shape, and then rolled up in a roll shape again. The image recording apparatus has the following units of a record medium supply unit 1 which is a unit for holding a record medium rolled in a roll shape and supplying the record medium, an ink application unit 2 which is a unit for applying an ink to a record medium, a heating unit 3 which is a unit for heating a record medium, and a record medium collection unit 4 which is a unit for rolling up a record medium on which an image is recorded. The record medium is conveyed by a conveyance unit containing a roller pair, a belt, and the like along a record medium conveyance route illustrated by the solid line in FIG. 1, and then processed in each unit described above. The record medium rolled up in a roll shape by the record medium collection unit 4 may be supplied to another device and the like to be subjected to process, e.g., cutting the record medium into a desired size, bookbinding, and the like.

In the present invention, the speed of conveying a record medium in the conveyance process of conveying a record medium is suitably 50 m/min or more. Furthermore, the speed is suitably 100 m/min or more.

In the present invention, it is suitable that tension is applied to a record medium in the conveyance thereof. More specifically, it is suitable for the image recording apparatus to have a tension application unit to generate tension. As a specific method, a tension application portion applying tension to a record medium, a tension adjustment portion adjusting the tension of the record medium, or the like may be provided in a conveyance mechanism between a record medium supply portion 1 and a record medium collection portion 4 in FIG. 1. When tension is applied to a record medium, swelling of fibers of the record medium due to water in an ink is suppressed. The swelling of the fibers of the record medium increases gaps between the fibers, which results in an increase in the ink permeation speed. However, when the ink permeation speed increases, the ink is likely to deeply permeate in a direction perpendicular to the surface of the record medium, so that the optical density of an image is not sufficiently obtained in some cases. As described above, the application of tension to the record medium suppresses the swelling of the fibers of the record medium due to water in the ink, and therefore a reduction in the optical density of an image due to the increase in the ink permeation speed can be suppressed.

The tension applied to a record medium is suitably 20 N/m or more. By setting the tension to 20 N/m, the swelling of the fibers of a record medium due to water in the ink is more efficiently suppressed. The tension applied to a record medium is more preferably 30 N/m or more and particularly preferably 40 N/m or more and 100 N/m or less.

Hereinafter, an ink application process and a heating process are individually described.

(1) Ink Application Process

In the present invention, an ink is applied to a record medium in the ink application process. As a system of applying an ink to a record medium, an ink jet system is suitably used. More specifically, the image recording method of the present invention is suitably an ink jet recording method. The ink jet system may be a so-called a thermal ink jet system of causing thermal energy to act on an ink to eject the ink from an ejection port of a recording head or a so-called piezoelectric ink jet system of ejecting an ink from an ejection port of a recording head using a piezoelectric element. The ink of the present invention is suitably used in the image recording method of the piezoelectric ink jet system from the viewpoint of ejection stability of the ink containing polyurethane resin particles.

The recording head may be a so-called serial type in which recording is performed by moving a recording head in a direction crossing to the conveyance direction of a record medium or a full-line type in which a plurality of nozzles are arranged in a range where the maximum width of a record medium to be used is covered. From the viewpoint of recording images at a higher speed, the recording head is suitably the full-line type ink jet recording head. In the full-line type ink jet recording head, nozzle arrays are suitably provided in such a manner as to be arranged in a direction orthogonal to the conveyance direction of a record medium. It is suitable that two or more of the full-line type ink jet recording heads are provided for respective ink colors and the recording heads are successively arranged in parallel to each other along the conveyance direction at order.

(2) Heating Process

In the present invention, heating is suitably performed in such a manner that the surface temperature of a record medium to which an ink is applied is 70° C. or higher in the heating process. The "surface temperature of the record medium to which an ink is applied" as used in the present invention refers to the temperature of the surface of the record medium at a position where the record medium reaches after 0.5 second conveyance when the time at which the ink is applied to the record medium is set to 0 second. Specifically, when the conveyance speed of the record medium is set to V (m/min), the temperature of the surface of an ink recording area X of the record medium may be measured at a position where the ink recording area X of the record medium moves by "V×0.5/60 (m)" along the conveyance direction of the record medium from a position where the ink is applied (position directly under the recording head in the case of the full-line type ink jet recording head). In Examples of the present invention, the temperature of the surface of the record medium was measured at a 10 cm position in a direction substantially perpendicular to the surface of the record medium using a noncontact infrared thermometer digital radiation temperature sensor FT-H20 (manufactured by KEYENCE).

In the present invention, the surface temperature of the record medium to which an ink is applied is suitably 80° C. or higher. From the viewpoint of preventing thermal deformation of the record medium due to the heat, the surface temperature of the record medium is suitably 140° C. or less. As a method for heating the record medium, a method is mentioned which includes heating the record medium from the front side (the side to which an ink is applied) and/or the back side of the record medium by providing a heater.

In the present invention, the heating in the heating process may be continuously performed before, during, and after the application of an ink. In the present invention, before an ink is applied to a record medium, the record medium is not heated, or even when the record medium is heated, the surface temperature of the record medium is preferably less than 70° C., more preferably 60° C. or less, and still more preferably 40° C. or less.

In the heating process, the record medium may be pressurized, for example, using a pressure roller or the like while the record medium is heated. The pressurization of the record medium can improve the fixability of images. The record medium may be pressurized during part of the heating process rather than throughout the heating process. The record medium may be pressurized in a multistep manner. The heating process may be followed by a pressing process.

Record Medium

In the image recording method of the present invention, any record medium that has been generally used heretofore can be used as the record medium to which an ink is to be applied. In particular, a record medium having a water absorption coefficient Ka of 0.1 $mL/m^2 \cdot ms^{1/2}$ or more is suitably used, a record medium having a water absorption coefficient Ka of 0.2 $mL/m^2 \cdot ms^{1/2}$ or more is more suitably used, and a record medium having a water absorption coefficient Ka of 0.3 $mL/m^2 \cdot ms^{1/2}$ or more is particularly suitably used.

Figure 2:
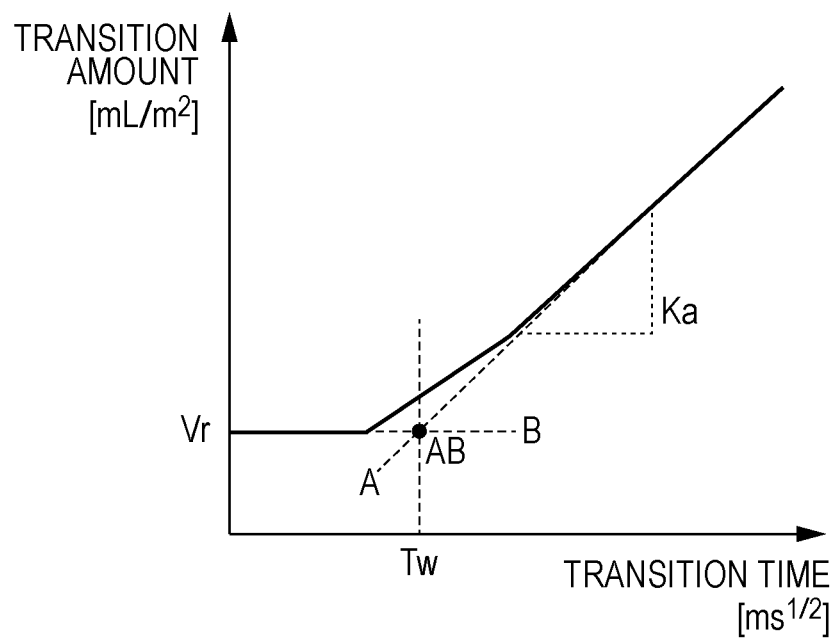
FIG. 2 is a view illustrating an example of an absorption curve for describing the absorption coefficient Ka of a record medium.

In the present invention, the Bristow's method described in "Liquid absorption testing method for paper and paperboard" in JAPAN TAPPI paper pulp testing method No. 51 is used as a method for calculating the absorption coefficient Ka of the record medium. The description of the Bristow's method is given in a large number of commercially available books, and thus a detailed description is omitted. The Bristow's method is defined by the wetting time Tw, the absorption coefficient Ka ($mL/m^2 \cdot ms^{1/2}$), and the roughness index Vr ($mL/m^2$). FIG. 2 illustrates an example of the absorption curve. The absorption curve illustrated in FIG. 2 is based on a permeation model in which liquid starts to permeate into a record medium at the wetting time Tw after the contact of the liquid with the record medium. The inclination of the straight line after the wetting time Tw is the absorption coefficient Ka. The absorption coefficient Ka corresponds to the permeation rate of the liquid into the record medium. As illustrated in FIG. 2, the wetting time Tw is determined as the time until the intersection AB of an approximate straight line A and a straight line B. The approximate straight line A is based on the least-squares method for calculating the absorption coefficient Ka and the straight line B is represented by V=Vr in which V is a transition amount of the liquid and Vr is a roughness index. In the present invention, 25° C. water is used as the liquid to permeate into the record medium. More specifically, Ka in the present invention represents the absorption coefficient for 25° C. water.

The record medium for use in the ink jet recording method of the present invention may be a record medium cut into a desired size beforehand or may be a rolled record medium, which is to be cut into a desired size after image formation. As described above, a rolled record medium is suitably used because tension is easily applied to the record medium.

EXAMPLES

Hereinafter, the present invention is described in more detail with reference to Examples and Comparative Examples. The present invention is not limited by Examples described below without deviating from the scope of the present invention. In the following description of Examples, a "part(s)" is(are) based on mass unless otherwise particularly specified.

Preparation of Ink

Each ink was prepared by mixing materials in such a manner as to have the contents (The unit are all % by mass.) shown in Table 1 below, sufficiently stirring the mixture for dispersion, and then filtering the dispersion through a glass filter AP20 (manufactured by Millipore Corporation). The contents (% by mass) of the pigment and the resin particles in Table 1 below are the solid contents (% by mass) of the pigment and the polyurethane resin particles in the ink. The abbreviations in Table 1 are as follows.

Self-dispersible pigment: Pigment having a phosphonic acid group bonded directly or through another atomic group to the surface of the pigment COJ 400: CAB-O-JET 400 (manufactured by Cabot Corporation)

COJ 450C: CAB-O-JET 450C (manufactured by Cabot Corporation)

COJ 465M: CAB-O-JET 465M (manufactured by Cabot Corporation)

COJ 470Y: CAB-O-JET 470Y (manufactured by Cabot Corporation)

Self-dispersible pigment: Pigment having a carboxylic acid group bonded through another atomic group to the surface COJ 200: CAB-O-JET 200 (manufactured by Cabot Corporation)

Pigment A: Self-dispersible pigment having a bisphosphonic acid group bonded thereto (A production method thereof is as described below.)

20.0 g of carbon black, 7.0 mmol of sodium ((4-aminobenzoylamino)-methane-1,1-diyl)bisphosphonate, 20.0 mmol of nitric acid, and 200.0 mL of pure water were mixed. The resultant mixture was mixed at 6,000 rpm at room temperature using a Silverson mixer. After 30 minutes, 20.0 mmol of sodium nitrite dissolved in a small amount of water was slowly added to the mixture. By the mixing, the temperature of the mixture reached 60° C., and the mixture was allowed to react for 1 hour in this state. Thereafter, the pH of the mixture was adjusted to 10 using an aqueous sodium hydroxide solution. After 30 minutes, 20.0 mL of pure water was added to the mixture, and then the resultant mixture was subjected to diafiltration using a Spectrum membrane. Ion exchange treatment was carried out to replace a sodium ion, which was a counter ion of the anionic group of the self-dispersing pigment, by a potassium ion. Then, the concentration of the pigment solid content was adjusted to provide a pigment dispersion liquid 1. The pigment dispersion liquid 1 contained a self-dispersible pigment having a ((4-aminobenzoylamino)-methane-1,1-diyl)bisphosphonic acid group, the counter ion of which was a potassium ion, bonded to the particle surface. The pigment content was 30.0%.

Surfactant

AE60: ACETYLENOL E60 (available from Kawaken Fine Chemicals Co., Ltd.)

Water-Soluble Organic Solvent

Gly: Glycerol

PEG: Polyethylene glycol (Number-average molecular weight: 1,000)

DEG: Diethylene glycol

Salt

KCl: Potassium chloride $KHCO_3$: Potassium hydrogencarbonate $KNO_3$: Potassium nitrate NaCl: Sodium chloride CaCl$_2$: Calcium chloride
PhCOOK: Potassium benzoate FIG. 1 having a piezoelectric inkjet head KJ4 (manufactured by KYOCERA Corporation; nozzle density: 600 dpi) and

TABLE 1

Ink preparation conditions

| Ink No. | Self-dispersible pigment | | Surfactant | | Resin particles | | Water-soluble organic solvent | | | Salt | | Mass ratio: Salt/Resin |
|---|---|---|---|---|---|---|---|---|---|---|---|---|
| | Type | Content (% by mass) | Type | Content (% by mass) | Type | Content (% by mass) | Gly (% by mass) | PEG (% by mass) | DEG (% by mass) | Type | Content (% by mass) | |
| Black Ink 1 | COJ400 | 5 | AE60 | 1 | PU-1 | 5 | 20 | 6 | 0 | KCl | 0.4 | 0.080 |
| Black Ink 2 | COJ400 | 5 | AE60 | 1 | PU-1 | 5 | 20 | 6 | 0 | KHCO3 | 0.4 | 0.080 |
| Black Ink 3 | COJ400 | 5 | AE60 | 1 | PU-1 | 5 | 20 | 6 | 0 | KNO3 | 0.4 | 0.080 |
| Black Ink 4 | COJ400 | 5 | AE60 | 1 | PU-2 | 5 | 20 | 6 | 0 | KCl | 0.4 | 0.080 |
| Black Ink 5 | COJ400 | 5 | AE60 | 1 | PU-3 | 5 | 20 | 6 | 0 | KCl | 0.4 | 0.080 |
| Black Ink 6 | COJ400 | 5 | AE60 | 1 | PU-4 | 5 | 20 | 6 | 0 | KCl | 0.4 | 0.080 |
| Black Ink 7 | COJ400 | 5 | AE60 | 1 | PU-5 | 5 | 20 | 6 | 0 | KCl | 0.4 | 0.080 |
| Cyan Ink 1 | COJ450C | 5 | AE60 | 1 | PU-1 | 5 | 20 | 6 | 0 | KCl | 0.4 | 0.080 |
| Cyan Ink 2 | COJ450C | 5 | AE60 | 1 | PU-1 | 5 | 20 | 6 | 0 | KHCO3 | 0.4 | 0.080 |
| Cyan Ink 3 | COJ450C | 5 | AE60 | 1 | PU-1 | 5 | 20 | 6 | 0 | KNO3 | 0.4 | 0.080 |
| Cyan Ink 4 | COJ450C | 5 | AE60 | 1 | PU-2 | 5 | 20 | 6 | 0 | KCl | 0.4 | 0.080 |
| Cyan Ink 5 | COJ450C | 5 | AE60 | 1 | PU-3 | 5 | 20 | 6 | 0 | KCl | 0.4 | 0.080 |
| Cyan Ink 6 | COJ450C | 5 | AE60 | 1 | PU-4 | 5 | 20 | 6 | 0 | KCl | 0.4 | 0.080 |
| Cyan Ink 7 | COJ450C | 5 | AE60 | 1 | PU-5 | 5 | 20 | 6 | 0 | KCl | 0.4 | 0.080 |
| Magenta Ink 1 | COJ465M | 5 | AE60 | 1 | PU-1 | 5 | 20 | 6 | 0 | KCl | 0.4 | 0.080 |
| Yellow Ink 1 | COJ470Y | 5 | AE60 | 1 | PU-1 | 5 | 20 | 6 | 0 | KCl | 0.4 | 0.080 |
| Black Ink 8 | Pigment A | 5 | AE60 | 1 | PU-1 | 5 | 20 | 6 | 0 | KCl | 0.4 | 0.080 |
| Black Ink 9 | COJ400 | 10 | AE60 | 1 | PU-1 | 5 | 20 | 6 | 0 | KCl | 0.4 | 0.080 |
| Black Ink 10 | COJ400 | 5 | AE60 | 1 | PU-1 | 5 | 20 | 6 | 0 | KCl | 0.4 | 0.120 |
| Black Ink 11 | COJ400 | 5 | AE60 | 1 | PU-1 | 5 | 20 | 6 | 0 | NaCl | 0.4 | 0.080 |
| Black Ink 12 | COJ400 | 5 | AE60 | 1 | PU-1 | 20 | 20 | 6 | 0 | KCl | 0.4 | 0.020 |
| Black Ink 13 | COJ400 | 5 | AE60 | 1 | PU-1 | 5 | 0 | 6 | 20 | KCl | 0.4 | 0.080 |
| Black Ink 14 | COJ200 | 5 | AE60 | 1 | PU-1 | 5 | 20 | 6 | 0 | KCl | 0.4 | 0.080 |
| Black Ink 15 | COJ400 | 5 | AE60 | 1 | St/AA | 5 | 20 | 6 | 0 | KCl | 0.4 | 0.080 |
| Black Ink 16 | COJ400 | 5 | AE60 | 1 | — | 0 | 20 | 6 | 0 | KCl | 0.4 | — |
| Black Ink 17 | COJ400 | 5 | AE60 | 1 | PU-1 | 5 | 0 | 6 | 20 | CaCl2 | 0.4 | 0.080 |
| Black Ink 18 | COJ400 | 5 | AE60 | 1 | PU-1 | 5 | 20 | 6 | 0 | PhCOOK | 0.4 | 0.080 |
| Black Ink 19 | COJ400 | 5 | AE60 | 1 | PU-1 | 5 | 20 | 6 | 0 | — | 0 | 0 |

In Table 1, St/AA is a styrene-acrylic acid copolymer (Acid value of 170). The details of the polyurethane resin particles in Table 1 are as shown in Table 2 below.

TABLE 2

Polyurethane resin particles

| Polyurethane resin particle No. | Product name | Manufacturer | Amount of anionic functional group of surface (mmol/g) |
|---|---|---|---|
| PU-1 | W5661 | Mitsui Chemicals, Inc. | 0.39 |
| PU-2 | WS-5100 | Mitsui Chemicals, Inc. | 0.25 |
| PU-3 | HUX370 | ADEKA CORPORATION | 0.21 |
| PU-4 | HUX420A | ADEKA CORPORATION | 0.27 |
| PU-5 | HUX232 | ADEKA CORPORATION | 0.47 |

Preparation of Image Sample

The following image sample was created on a record medium using the inkjet recording apparatus illustrated in FIG. 1 having a piezoelectric inkjet head KJ4 (manufactured by KYOCERA Corporation; nozzle density: 600 dpi) and evaluated. The recording conditions are as follows: Temperature: 25° C.; Relative humidity: 55%; Ink ejection frequency: 39 kHz; Record medium conveyance speed: 100 m/s; and Ink ejection volume during recording: about 13 pl per dot. For the inkjet recording apparatus, a condition for applying a dot of an ink droplet (13 ng) to a unit region of ⅙₀₀ inch× ⅙₀₀ inch at a resolution of 600 dpi×600 dpi is defined as a 100% recording duty.

Evaluation

The following evaluation was carried out using the inkjet recording apparatus (having a piezoelectric inkjet head KJ4 (manufactured by KYOCERA Corporation; Nozzle density: 600 dpi)) illustrated in FIG. 1 containing inks shown in Table 3. The recording conditions are as follows: Temperature: 25° C.; Relative humidity: 55%; Ink ejection frequency: 39 kHz; Record medium conveyance speed: 100 m/s; and Ink ejection volume during recording: about 13 pl per dot. For the inkjet recording apparatus, a condition for applying a dot of an ink droplet (13 ng) to a unit region of ⅙₀₀ inch× ⅙₀₀ inch at a resolution of 600 dpi×600 dpi is defined as a 100% recording duty.

Color Development Properties of Image

A 3 cm×3 cm solid image (100% recording duty) was recorded on a record medium: OK Prince High Quality (Basis weight: 64 g/m2) (manufactured by Oji Paper Co., Ltd.) using the inkjet recording apparatus described above. The optical density of the obtained image was determined with a reflection densitometer RD19I (manufactured by Gretag-Macbeth GmbH). The optical density of the image was evaluated based on the following evaluation criteria. In the present invention, A and B are acceptable levels and C is an unacceptable level in the following evaluation criteria. The evaluation results are shown in Table 3.

Black Ink, Cyan Ink
A: The optical density was 1.1 or more.
B: The optical density was 1.0 or more and less than 1.1.
C: The optical density was less than 1.0.

Magenta Ink, Yellow Ink
A: The optical density was 1.0 or more.
B: The optical density was 0.9 or more and less than 1.0.
C: The optical density was less than 0.9.

Scratch Resistance of Image

Using the ink jet recording apparatus described above, three 3 mm wide lines and one 17 mm wide line (all having 100% recording duty) were recorded in such a manner that the lines are parallel to each other on a record medium: DL9084 (Basis weight of 91 g/m$^2$) (manufactured by Mitsubishi Paper Mills Limited). Within 3 minutes after the image was recorded, an OK Top Coat+ sheet (Basis weight: 105 g/m$^2$) (manufactured by Oji Paper Co., Ltd.) was placed on the image, and a 500 g weight was further placed on the sheet in such a manner that the contact area between the 500 g weight and the sheet was 12.6 cm$^2$. A scratch resistance test was performed by performing rubbing once in such a manner that the relative speed between the record medium on which the image was recorded and the OK Top Coat+ sheet was 10 cm/s. In this test, the rubbing was performed in such a manner that the contact surface of the weight crossed the four lines at right angles. Thereafter, an ink adhering to the 12.6 cm$^2$ area of the OK Top Coat+ sheet on which the weight was placed was read with a scanner (Multifunction device iR3245F (manufactured by CANON KABUSHIKI KAISHA), 600 dpi, Gray scale, Photograph mode). The percentage of the area having brightness of less than 128 out of 256 tones (Percentage of ink adhesion area) was calculated. The scratch resistance of images was evaluated according to the following criteria. In the present invention, A and B are acceptable levels and C is an unacceptable level in the following evaluation criteria. The evaluation results are shown in Table 3.

A: The percentage of the ink adhesion area was 1% or less.
B: The percentage of the ink adhesion area was more than 1% and 5% or less.
C: The percentage of the ink adhesion area was more than 5%.

Ink storage stability

Each ink above was measured for the viscosity using an E type viscometer RE80 (manufactured by Toki Sangyo Co., Ltd.), and then stored in a 60° C. oven for two weeks. The viscosity of each ink after storage was measured again, and then the viscosity change before and after the storage was calculated. The ink viscosity change as used in the present invention refers to a value calculated from $\Delta\eta = |\eta_1 - \eta_2|/\eta_1$ using a viscosity $\eta_1$ (cP) of each ink immediately after the ink preparation and a viscosity $\eta_2$ (cP) of each ink after 12 day storage in a 60° C. environment after the preparation of the ink. The storage stability of each ink was evaluated based on the following evaluation criteria. In the present invention, A and B are acceptable levels and C is an unacceptable level in the following evaluation criteria. The evaluation results are shown in Table 3.

A: The viscosity change was less than 4%.
B: The viscosity change was 4% or more and less than 8%.
C: The viscosity change was 8% or more.

Ink Ejection Stability

Using the ink jet recording apparatus described above, solid images (100% recording duty) having a length in a direction perpendicular to the conveyance direction of the record medium of 10.5 cm and a length in the conveyance direction of the record medium of 30 cm were recorded 10,000 times at 15 cm intervals on a record medium: DL9084 (Basis weight of 91 g/m$^2$) (manufactured by Mitsubishi Paper Mills Limited). The first image and the 10,000th image were visually observed to compare streaks or color unevenness. Then, the ink ejection stability was evaluated based on the following evaluation criteria. The evaluation results are shown in Table 3.

A: No difference was observed in the two kinds of images.
B: A slight difference was observed in the two kinds of images.
C: Noticeable difference was observed in the two kinds of images.

TABLE 3

| | | Evaluation results | | | |
|---|---|---|---|---|---|
| Example No. | Ink No. | Color development properties of image | Scratch resistance of image | Ink storage stability | Ink ejection stability |
| Ex. 1 | Black Ink 1 | A | A | A | A |
| Ex. 2 | Black Ink 2 | A | A | A | A |
| Ex. 3 | Black Ink 3 | A | A | A | A |
| Ex. 4 | Black Ink 4 | A | A | A | A |
| Ex. 5 | Black Ink 5 | A | A | A | A |
| Ex. 6 | Black Ink 6 | A | A | A | A |
| Ex. 7 | Black Ink 7 | A | A | A | A |
| Ex. 8 | Cyan Ink 1 | A | A | A | A |
| Ex. 9 | Cyan Ink 2 | A | A | A | A |
| Ex. 10 | Cyan Ink 3 | A | A | A | A |
| Ex. 11 | Cyan Ink 4 | A | A | A | A |
| Ex. 12 | Cyan Ink 5 | A | A | A | A |
| Ex. 13 | Cyan Ink 6 | A | A | A | A |
| Ex. 14 | Cyan Ink 7 | A | A | A | A |
| Ex. 15 | Magenta Ink 1 | A | A | A | A |
| Ex. 16 | Yellow Ink 1 | A | A | A | A |
| Ex. 17 | Black Ink 8 | A | A | A | A |
| Ex. 18 | Black Ink 9 | A | A | B | A |
| Ex. 19 | Black Ink 10 | A | A | B | B |
| Ex. 20 | Black Ink 11 | B | A | A | B |
| Ex. 21 | Black Ink 12 | A | A | A | B |
| Ex. 22 | Black Ink 13 | B | A | A | A |
| Comp. Ex. 1 | Black Ink 14 | C | A | A | A |
| Comp. Ex. 2 | Black Ink 15 | C | A | B | A |
| Comp. Ex. 3 | Black Ink 16 | A | C | A | A |
| Comp. Ex. 4 | Black Ink 17 | B | B | C | C |
| Comp. Ex. 5 | Black Ink 18 | A | A | C | B |
| Comp. Ex. 6 | Black Ink 19 | B | A | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-149975, filed Jul. 29, 2015 which is hereby incorporated by reference herein in its entirety.

What is claimed is:

1. An ink comprising:
   a self-dispersible pigment having a phosphonic acid group bonded directly or through another atomic group to a surface of the self-dispersible pigment;
   polyurethane resin particles;
   a monovalent inorganic salt; and
   water;
   wherein a content of the monovalent inorganic salt in the ink is 0.005% by mass or more and 10.0% by mass or less based on a total mass of the ink.

2. The ink according to claim 1, wherein the phosphonic acid group is a bisphosphonic acid group.

3. The ink according to claim 1, wherein a content (% by mass) of the self-dispersible pigment in the ink is 0.1% by mass or more and 8.0% by mass or less based on a total mass of the ink.

4. The ink according to claim 1, wherein a content (% by mass) of the inorganic salt is 0.05 times or more and 0.1 times or less a content of the polyurethane resin particles.

5. The ink according to claim 1, wherein the inorganic salt is a potassium salt.

6. The ink according to claim 1, wherein the ink has an electroconductivity of 500 µS/cm or more and 3000 µS/cm or less.

7. The ink according to claim 1, wherein a content of the polyurethane resin particles in the ink is 3.0% by mass or more and 15.0% by mass or less based on a total mass of the ink.

8. The ink according to claim 1, comprising:
   polyethylene glycol and glycerol.

9. The ink according to claim 1, wherein a content of the monovalent inorganic salt in the ink is 0.01% by mass or more and 5% by mass or less based on a total mass of the ink.

10. The ink according to claim 1, wherein an amount of anionic functional groups of a surface of the polyurethane resin particles is 0.1 mmol/g or more and 0.4 mmol/g or less.

11. The ink according to claim 1, wherein an acid value of the polyurethane resin particles is 100 mgKOH/g or less.

12. The ink according to claim 1, wherein the phosphonic acid group has the formula $-CQ(PO_3M_2)_2$, wherein Q represents a member selected from the group consisting of a hydrogen atom, R', OR', SR', and NR'$_2$, wherein R' independently represents a member selected from the group consisting of a hydrogen atom, an alkyl group, an acyl group, an aralkyl group, and an aryl group, and wherein M represents a member selected from the group consisting of a hydrogen atom, alkaline metal, ammonium, and organic ammonium.

13. An ink cartridge comprising:
    an ink containing portion containing an ink containing a self-dispersible pigment having a phosphonic acid group bonded directly or through another atomic group to a surface of the self-dispersible pigment;
    polyurethane resin particles;
    a monovalent inorganic salt; and
    water;
    wherein a content of the monovalent inorganic salt in the ink is 0.005% by mass or more and 10.0% by mass or less based on a total mass of the ink.

14. An image recording method comprising:
    applying an ink to a recording medium,
    the ink containing a self-dispersible pigment having a phosphonic acid group bonded directly or through another atomic group to a surface of the self-dispersible pigment;
    polyurethane resin particles;
    a monovalent inorganic salt; and
    water;
    wherein a content of the monovalent inorganic salt in the ink is 0.005% by mass or more and 10.0% by mass or less based on a total mass of the ink.

* * * * *